(12) United States Patent
Kurashige et al.

(10) Patent No.: US 9,366,946 B2
(45) Date of Patent: Jun. 14, 2016

(54) PROJECTION APPARATUS AND PROJECTION CONTROL APPARATUS

(75) Inventors: Makio Kurashige, Kashiwa (JP); Yukio Taniguchi, Matsudo (JP); Yasuyuki Ooyagi, Funabashi (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 141 days.

(21) Appl. No.: 14/113,312

(22) PCT Filed: Apr. 19, 2012

(86) PCT No.: PCT/JP2012/060632
§ 371 (c)(1),
(2), (4) Date: Oct. 22, 2013

(87) PCT Pub. No.: WO2012/147627
PCT Pub. Date: Nov. 1, 2012

(65) Prior Publication Data
US 2014/0043591 A1    Feb. 13, 2014

(30) Foreign Application Priority Data

Apr. 28, 2011 (JP) .................................. 2011-101348
Dec. 19, 2011 (JP) .................................. 2011-277134

(51) Int. Cl.
*G03B 21/14* (2006.01)
*G03H 1/22* (2006.01)
(Continued)

(52) U.S. Cl.
CPC ............... *G03B 21/142* (2013.01); *G02B 5/32* (2013.01); *G02B 27/48* (2013.01); *G03B 21/208* (2013.01);
(Continued)

(58) Field of Classification Search
CPC .......... H04N 13/0285; H04N 13/0404; H04N 13/0409; G03H 2210/19; G03H 2210/30; G03H 2210/454; G03H 1/2294

USPC ............. 353/10, 30, 37, 38, 94, 98–99, 102; 359/1–2, 9–11, 30, 35
See application file for complete search history.

(56) References Cited

U.S. PATENT DOCUMENTS

| | | |
|---|---|---|
| 5,313,479 A | 5/1994 | Florence |
| 6,229,648 B1 | 5/2001 | Barak |

(Continued)

FOREIGN PATENT DOCUMENTS

| | | |
|---|---|---|
| CN | 1952772 A | 4/2007 |
| CN | 101203802 A | 6/2008 |

(Continued)

OTHER PUBLICATIONS

Extended European Search Report (Application No. 12777365.3) dated Oct. 8, 2014.

(Continued)

*Primary Examiner* — Sultan Chowdhury
(74) *Attorney, Agent, or Firm* — Burr & Brown, PLLC

(57) ABSTRACT

A projection apparatus has an optical device configured to be capable of diffusing coherent light beams, an irradiation unit configured to irradiate the coherent light beams to the optical device so that the coherent light beams scan the optical device, a light modulator that is illuminated by coherent light beams incident on and diffused at respective points of the optical device from the irradiation unit, a projection optical system configured to project a modulated image generated by the light modulator onto a scattering plane, and an intermediate optical system provided between the optical device and the light modulator, configured to restrict an diffusion angle of coherent light beams diffused by the optical device.

16 Claims, 10 Drawing Sheets

(51) Int. Cl.
*G02B 27/48* (2006.01)
*G03B 21/20* (2006.01)
*G02B 5/32* (2006.01)
*G03H 1/32* (2006.01)
*H04N 9/31* (2006.01)
*G03H 1/04* (2006.01)

(52) U.S. Cl.
CPC ........ *G03B 21/2033* (2013.01); *G03B 21/2066* (2013.01); *G03H 1/2294* (2013.01); *G03H 1/32* (2013.01); *H04N 9/3129* (2013.01); *G03H 2001/0439* (2013.01); *G03H 2001/2292* (2013.01)

(56) References Cited

U.S. PATENT DOCUMENTS

| | | | |
|---|---|---|---|
| 6,511,186 B1 * | 1/2003 | Burstyn | H04N 5/74 348/E5.137 |
| 7,545,837 B2 | 6/2009 | Oka | |
| 8,004,754 B2 | 8/2011 | Kamm et al. | |
| 8,029,146 B2 | 10/2011 | Yamauchi et al. | |
| 8,398,243 B2 * | 3/2013 | Renaud-Goud | 353/30 |
| 2001/0033367 A1 * | 10/2001 | Karasawa | G03B 21/26 353/30 |
| 2002/0071472 A1 * | 6/2002 | Dickson et al. | 372/102 |
| 2003/0039036 A1 * | 2/2003 | Kruschwitz et al. | 359/707 |
| 2006/0050374 A1 * | 3/2006 | Slinger | G03H 1/2205 359/385 |
| 2007/0085978 A1 | 4/2007 | Yamauchi | |
| 2007/0211322 A1 * | 9/2007 | Chao | 359/35 |
| 2008/0231924 A1 | 9/2008 | Yamauchi | |
| 2008/0247022 A1 | 10/2008 | Yamauchi et al. | |
| 2008/0247167 A1 | 10/2008 | Matsubara et al. | |
| 2008/0310002 A1 | 12/2008 | Shikita et al. | |
| 2009/0161072 A1 * | 6/2009 | Yamauchi et al. | 353/20 |
| 2009/0207466 A1 * | 8/2009 | Bucklay | 359/9 |
| 2009/0289950 A1 | 11/2009 | Hamano et al. | |
| 2010/0002091 A1 | 1/2010 | Dutta et al. | |
| 2010/0020291 A1 | 1/2010 | Kasazumi et al. | |
| 2010/0046049 A1 * | 2/2010 | Kroll | G03H 1/02 359/9 |
| 2011/0043876 A1 | 2/2011 | Kurashige et al. | |

FOREIGN PATENT DOCUMENTS

| | | |
|---|---|---|
| JP | 06-208089 A1 | 7/1994 |
| JP | 2002-510811 A1 | 4/2002 |
| JP | 2006-100772 A | 4/2006 |
| JP | 2006/137326 A1 | 12/2006 |
| JP | 2007-114358 A1 | 5/2007 |
| JP | 2008-096777 A1 | 4/2008 |
| JP | 2008-175869 A | 7/2008 |
| JP | 2008-224760 A1 | 9/2008 |
| JP | 2008-233739 A1 | 10/2008 |
| JP | 2008-256822 A1 | 10/2008 |
| JP | 2008-256824 A | 10/2008 |
| JP | 2008-257242 A | 10/2008 |
| JP | 2008-304726 A1 | 12/2008 |
| JP | 2009-282083 A1 | 12/2009 |
| JP | 2010-117494 A1 | 5/2010 |
| JP | 2011-043603 A1 | 3/2011 |

OTHER PUBLICATIONS

Chinese Office Action (Application No. 201280020654.x) dated Feb. 3, 2015 (with English translation).
Joseph W. Goodman, "*Speckle Phenomena in Optics Theory and Applications*," Chapter 6, Speckle in Certain Imaging Applications, Roberts & Co., 2006, pp. 187-233.
International Search Report dated Jun. 26, 2012 (with English translation).
International Preliminary Report on Patentability dated Feb. 15, 2013.
Japanese Office Action (With English Translation), Japanese Application No. 2013-225491, dated Aug. 4, 2015 (8 pages).
Japanese Office Action (Application No. 2013-225491) dated Mar. 4, 2016 (with English translation).

* cited by examiner

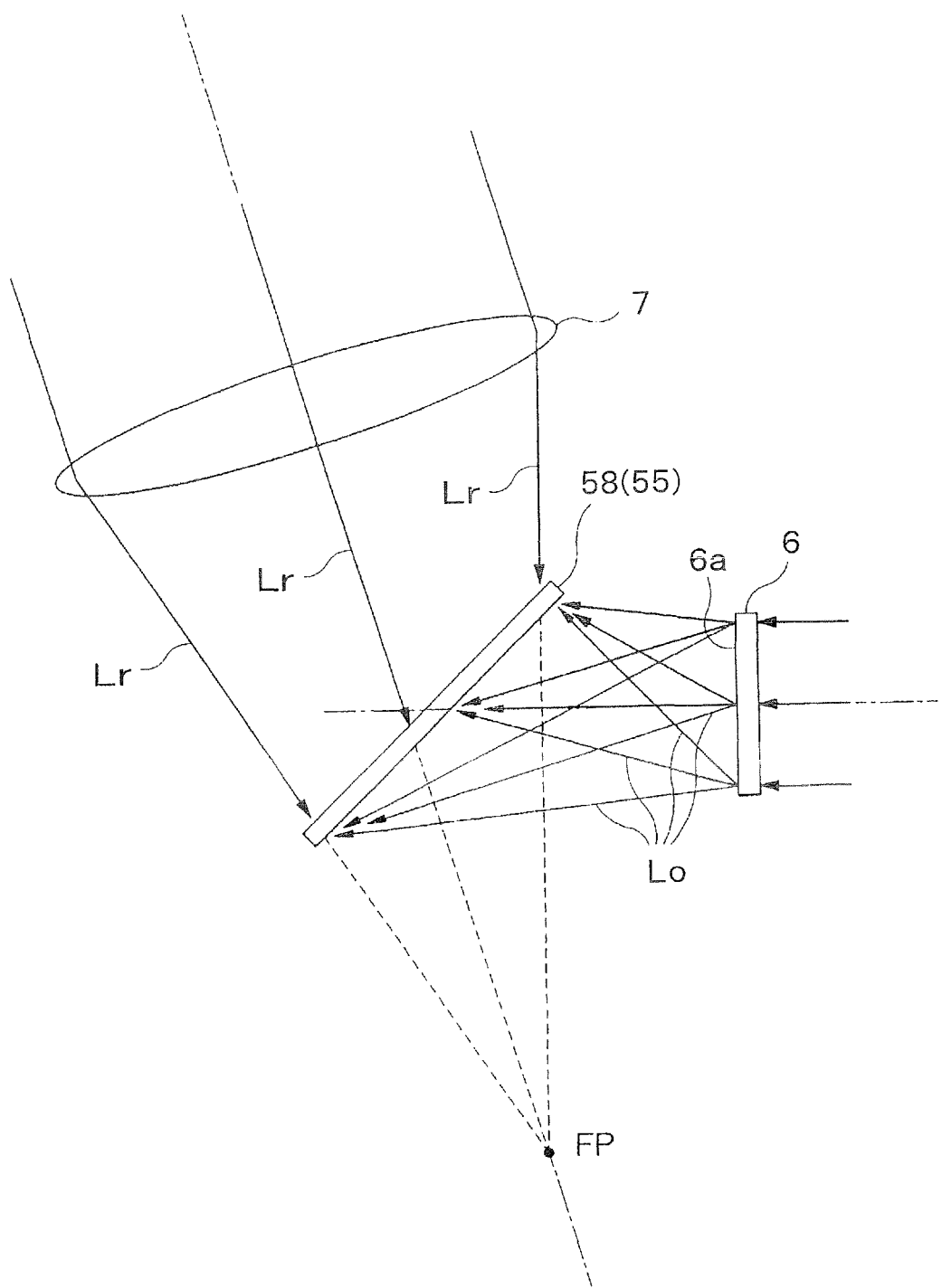
F I G. 3

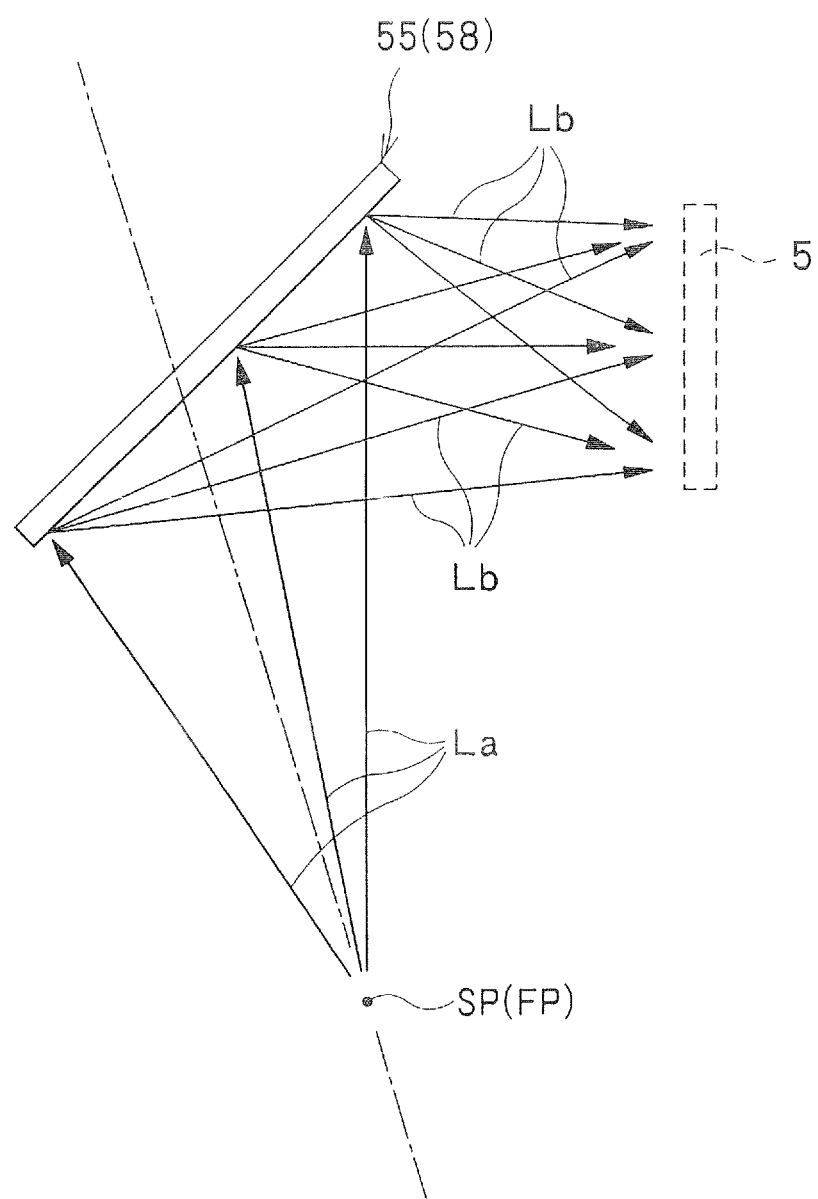
F I G. 4

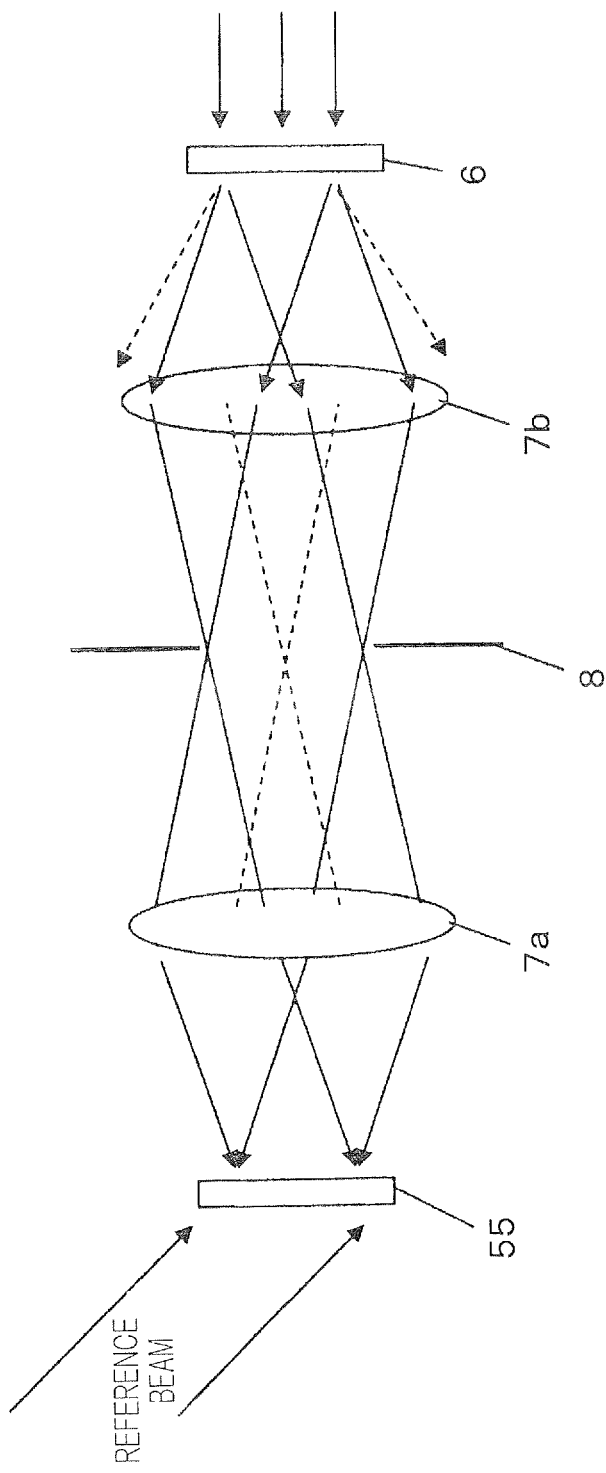
F I G. 5

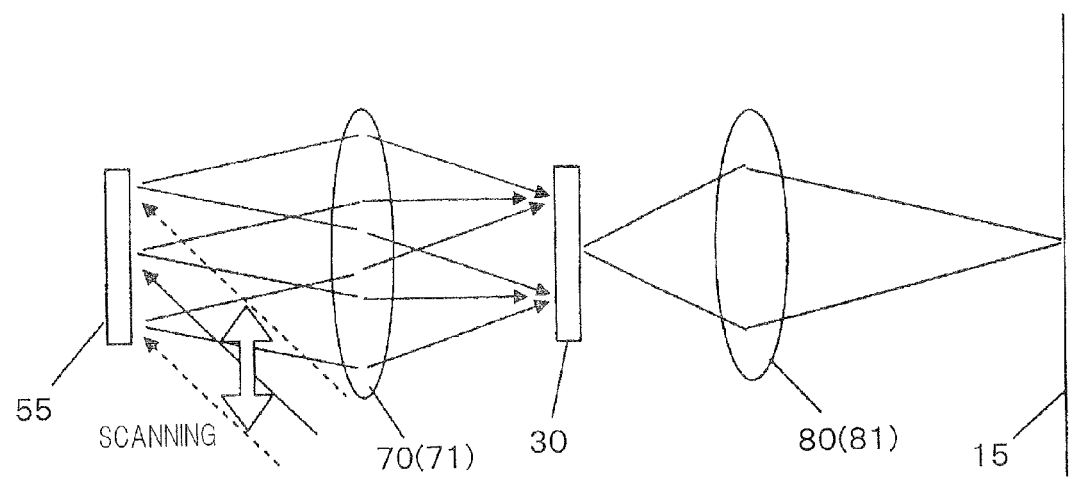
F I G. 6

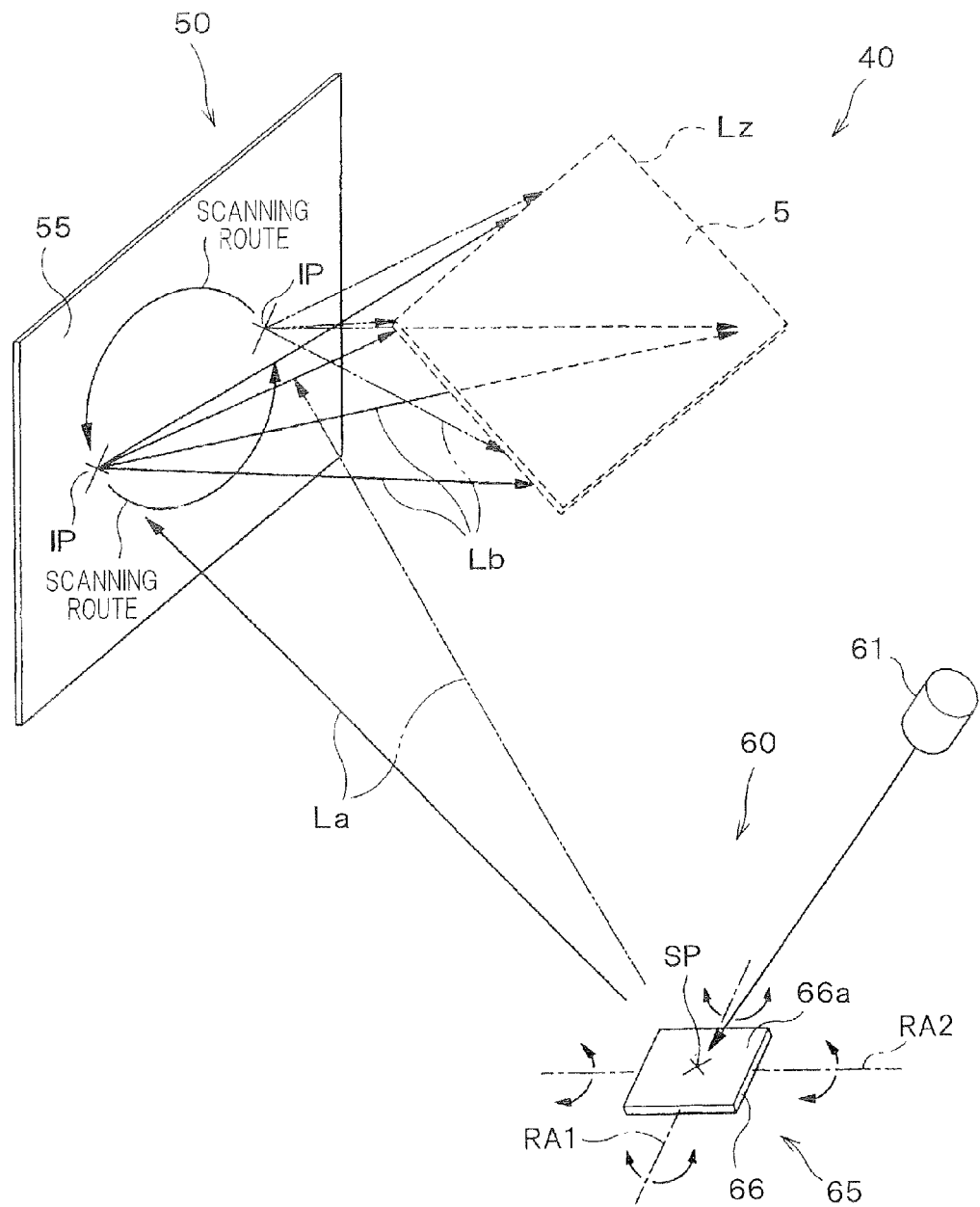
F I G. 10

PROJECTION APPARATUS AND PROJECTION CONTROL APPARATUS

BACKGROUND OF THE INVENTION

1. Field of the Invention

The present invention relates to a projection apparatus using a light source for emitting coherent light beams and a projection control apparatus.

2. Description of Related Art

Projection apparatuses that project light beams of an image onto a screen have been widely used. In a typical projection apparatus, a two-dimensional image is created as a basic image using a spatial light modulator such as a liquid crystal microdisplay or a DMD (Digital Micromirror Device), and then the two-dimensional image is magnified and projected onto a screen using a projection optical system, so that an image is displayed on the screen.

As projection apparatuses, various types including a commercialized product called an "optical projector" have been proposed. In general optical projectors, a spatial light modulator such as a liquid crystal display is illuminated using an illumination device having a white light source such as a high pressure mercury lamp to obtain a modulated image, and the obtained modulated image is magnified and projected onto a screen through lenses. For example, Japanese Patent Laid-Open No. 2009-282083 discloses a technique to divide white light generated by a supper-high pressure mercury lamp into three primary color components R, G, and B with a dichroic mirror, guide these light beams to spatial light modulators corresponding to the respective primary colors to create modulated images, and combine the created modulated images corresponding to the respective primary colors by a cross dichroic prism, to project the images onto a screen.

However, high intensity discharge lamps such as high pressure mercury lamps have a short lifecycle and when they are used for optical projectors or the like, they need to be frequently replaced. In addition, since a relatively large optical system such as a dichroic mirror is needed to extract light beams of the respective primary color components, there is a problem in that the entire system becomes larger.

In order to cope with such problems, a system using a coherent light source such as a laser has also been proposed. For example, semiconductor lasers which have been widely used in industries have a very long lifecycle in comparison with high intensity discharge lamps such as high pressure mercury lamps. In addition, since semiconductor lasers are capable of generating light of a single wavelength, a spectroscopic apparatus such as a dichroic mirror is unnecessary, so that there is an advantage in that the entire system becomes smaller.

For example, Japanese Patent Laid-Open No. 2008-224760 discloses a technique in which a galvano scanner performs scanning with laser beams to create a two-dimensional image on a light diffusion plate. The light diffusion plate disclosed in Japanese Patent Laid-Open No. 2008-224760 is installed for widening an angle of view. A two-dimensional image created on the light diffusion plate is projected onto a screen as it is. Therefore, the quality of a projected image is deteriorated.

On the other hand, in the system using a coherent light source of laser beams or the like, there is a new problem in that speckles are generated. Speckles are a spotted pattern which is formed when a coherent light beam such as a laser beam is emitted to a scattering plane. If speckles are generated on a screen, they are observed as spotted luminance unevenness, i.e. brightness unevenness, thus becoming a factor of having physiologically adverse affect on an observer. It is considered that the reason why speckles are generated in the case of using coherent light beams is that coherent light beams reflected from respective portions of a scattering and reflecting plane such as a screen have very high coherency so that coherent light beams interfere with one another to generate speckles. For example, a theoretical review of the generation of speckles is made in detail in Speckle Phenomena in Optics, Joseph W. Goodman, Roberts & Co., 2006.

As discussed above, in the system using a coherent light source, there is a problem in which speckles unique to the coherent light source are generated. Therefore, techniques for suppressing the generation of speckles have been proposed. For example, Japanese Patent Laid-Open No. 6-208089 discloses a technique in which a laser beam is emitted to a scattering plate, scattered light beams obtained therefrom are guided to a spatial light modulator, and the scattering plate is driven to rotate by a motor, thus reducing speckles.

SUMMARY OF THE INVENTION

As described above, with respect to projection apparatuses using a coherent light source, techniques for reducing speckles have been proposed, however, the techniques proposed so far cannot effectively and sufficiently suppress the generation of speckles. For example, according to the method disclosed in Japanese Patent Laid-Open No. 6-208089 described above, laser beams irradiated to a scattering plate are scattered. Therefore, part of the laser beams is inevitably lost with no contribution to image display. In addition, a scattering plate needs to be rotated in order to reduce speckles. However, such a mechanical rotation mechanism requires a relatively large size of apparatus, and power consumption is increased. Moreover, even if the scattering plate is rotated, the position of the optical axis of an illumination light beam is not changed, hence it is impossible to sufficiently suppress the generation of speckles caused by the diffusion on a screen.

Coherent light beams, for example laser beams as a typical example, have excellent straightness and can emit a light of extremely high energy density. Therefore, as illumination devices to be actually developed, it is preferable to design the optical path of coherent light beams in accordance with the characteristics of coherent light beams.

The inventors have extensively researched under consideration of the points discussed above, and as a result, the inventors have contrived the invention regarding a projection apparatus for projecting a modulated image created by a light modulator while the light modulator is being illuminated with coherent light beams. Moreover, the inventors have proceeded with researches and succeeded in improvement in the projection apparatus to constantly prevent the generation of a region extremely bright in the region illuminated with coherent light beams when the light modulator is being illuminated with coherent light beams. Namely, the purpose of the present invention is to provide a projection apparatus and a projection control apparatus which can make speckles inconspicuous and effectively suppressing the generation of brightness unevenness in a region illuminated with coherent light beams and enhance illumination intensity in the region illuminated with coherent light beams.

In order to solve the problems above, according to an aspect of the present invention, there is provided a projection apparatus comprising:

an optical device configured to be capable of diffusing coherent light beams;

an irradiation unit configured to irradiate the coherent light beams to the optical device so that the coherent light beams scan the optical device;

a light modulator that is illuminated by coherent light beams incident on and diffused at respective points of the optical device from the irradiation unit;

a projection optical system configured to project a modulated image generated by the light modulator onto a scattering plane; and an intermediate optical system provided between the optical device and the light modulator, configured to restrict an diffusion angle of coherent light beams diffused by the optical device, wherein, after the diffusion angle is restricted by the intermediate optical system, the coherent light beams diffused by the optical device are superimposed on one another to illuminate the light modulator.

According to the present invention, it is possible to effectively make speckles inconspicuous in an illuminated region or on an image projection surface and effectively suppress the generation of unevenness of brightness and color in the illuminated region or on the image projection surface, and also to improve the illumination intensity in the illuminated region. Moreover, by providing an intermediate optical system, it is possible to make telecentric the light modulator side of a projection optical system. Therefore, it is possible to simplify the design of a projection optical system, make the projection optical system compact, and reduce parts cost.

BRIEF DESCRIPTION OF DRAWINGS

FIG. 3 is a view explaining a state in which an image of a scattering plate is generated on a hologram recording medium 55 as interference fringes;

FIG. 4 is a view explaining a state in which an image of a scattering plate is reproduced using interference fringes formed in the hologram recording medium 55 obtained through an exposure process of FIG. 2;

FIG. 5 is a view explaining a method of, having the intermediate optical system 70 provided at an optimum location, forming interference fringes on the hologram recording medium 55;

FIG. 6 is a view explaining a state in which a hologram recording medium produced with the method of FIG. 5 is reproduced;

FIG. 10 is a view showing an example of rotating a mirror device 66 in a two-axis direction.

DETAILED DESCRIPTION OF THE INVENTION

Hereinafter, embodiments of the present invention will be explained with reference to the drawings. In the accompanying drawings of the present description, in order to simplify the drawings and make understanding easy, the scale, the ratio of height to width, etc., are appropriately modified or enlarged.

Figure 1:
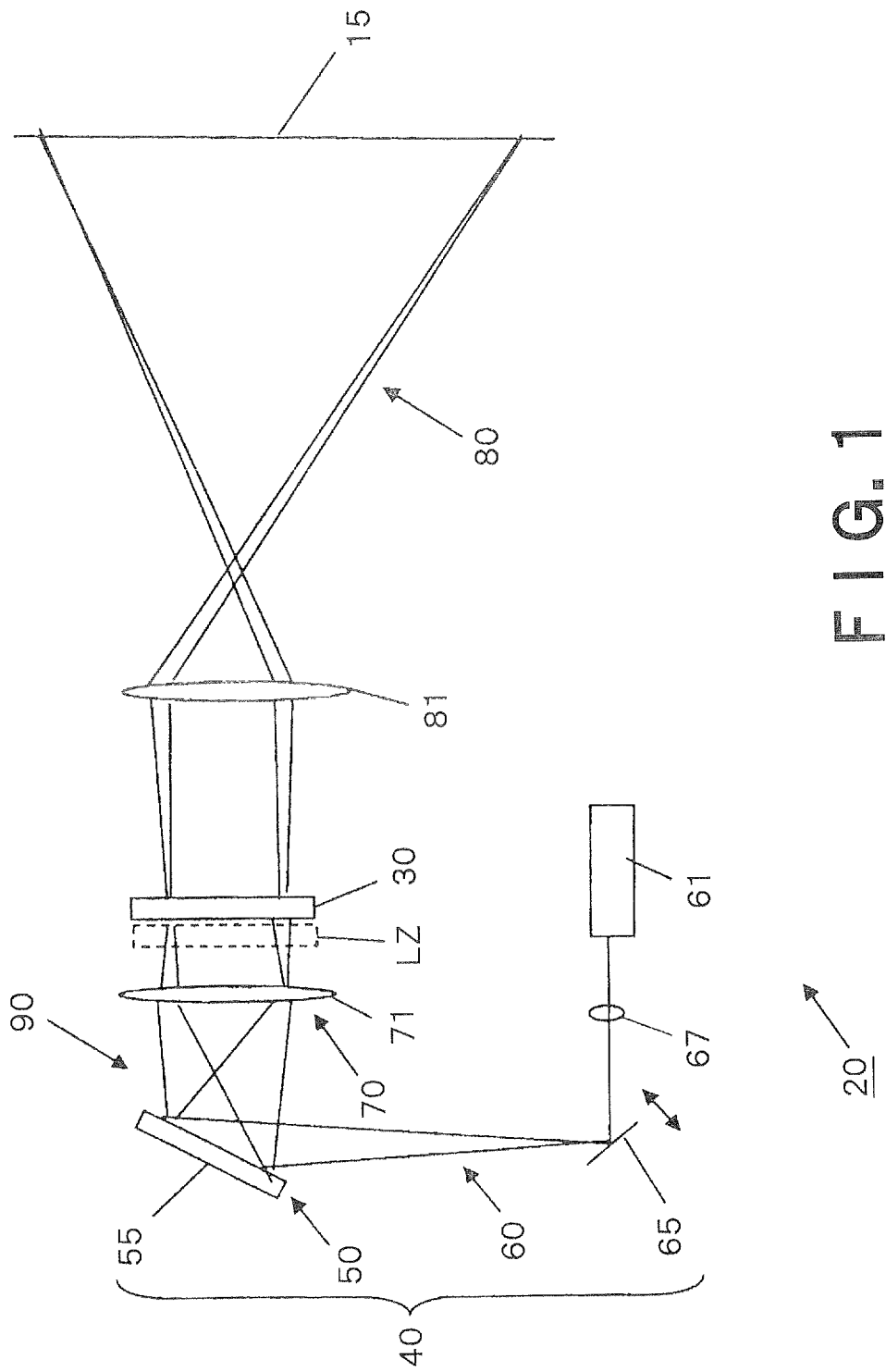
FIG. 1 is a view showing a schematic configuration of a projection apparatus according to an embodiment of the present invention.

FIG. 1 is a block diagram schematically showing the configuration of a projection apparatus 20 according to an embodiment. The projection apparatus 20 of FIG. 1 is provided with an optical device 50, an irradiation unit 60, a light modulator 30, an intermediate optical system 70, and a projection optical system 80. In this specification, a device that contains the optical device 50 and the irradiation unit 60 is referred to as an illumination device 40.

The irradiation unit 60 irradiates the optical device 50 with coherent light beams so that the coherent light beams scan the surface of the optical device 50. The irradiation unit 60 has a laser source 61 that emits coherent light beams and a scanning device 65 that scans the surface of the optical device 50 with the coherent light beams emitted from the laser source 61.

The optical device 50 has a hologram recording medium 55 that can reproduce an image of a scattering plate in an illumination zone LZ that is provided to be overlapped with the light modulator 30. The details of the hologram recording medium 55 will be explained later. A coherent light beam reflected by the scanning device 65 is incident on the hologram recording medium 55. An interference fringe is formed on the hologram recording medium 55. When a coherent light beam is incident, a coherent light beam diffracted by the interference fringe is emitted as diverging light, i.e. diffused light. In more detail, coherent light beams incident on respective positions of the hologram recording medium 55 from the irradiation unit 60 are diffracted by the hologram recording medium 55, pass through the intermediate optical system 70, and then illuminate the zones that are overlapped with one another at least partially. In the present embodiment, the same illumination zone LZ is illuminated through the hologram recording medium 55 and the intermediate optical system 70.

The scanning device 65 changes a reflection angle of incident coherent light beams at a constant interval to make reflected coherent light beams scan the hologram recording medium 55.

Coherent light beams incident on respective positions of the hologram recording medium 55 are incident on the intermediate optical system 70 as diffused light. The intermediate optical system 70 is provided between the hologram recording medium 55 and the spatial light modulator 30 to restrict a diffusion angle, hereinafter, also referred to as a diversion angle, of coherent light beams diffused by the hologram recording medium 55. The intermediate optical system 70 includes a field lens 71 that has a convex shape on both sides, a field lens 71 having a convex shape at the hologram recording medium 55 side but flat at the spatial light modulator 30 side, or the like.

Figure 2:
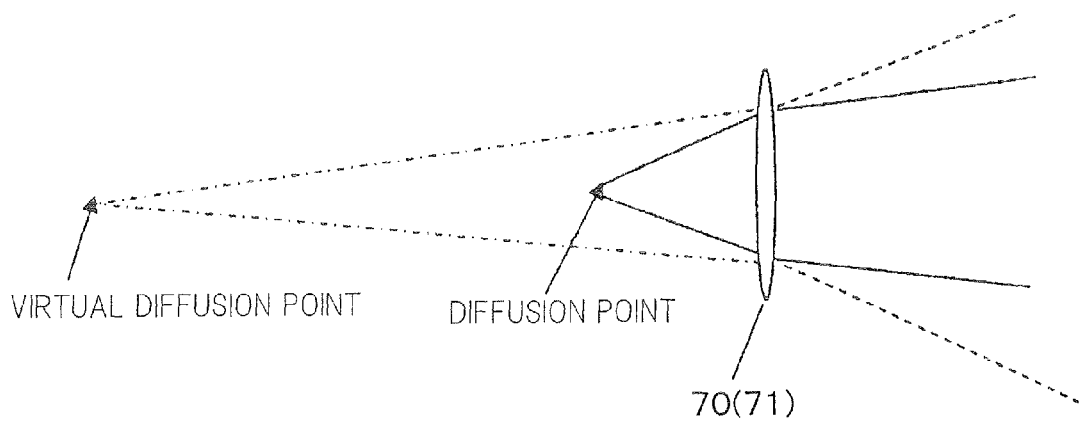
FIG. 2 is view explaining a function of an intermediate optical system 70.

FIG. 2 is view explaining a function of the intermediate optical system 70. The intermediate optical system 70 performs a function of virtually shifting a diversion point set at an arbitrary location on the hologram recording medium 55 away from the arbitrary location. With this function, the diversion angle of coherent light beams incident on and diffused by the intermediate optical system 70 is restricted compared to the case of no intermediate optical system 70, as shown by dashed lines and solid lines in FIG. 2.

By providing the intermediate optical system 70 described above, the diffusion angles of coherent light beams diffused at arbitrary points on the hologram recording medium 55 are restricted by the intermediate optical system 70. The coherent light beams having restricted diffusion angles are then incident on an illumination zone LZ provided at the position of the spatial light modulator 30. Accordingly, among the coherent light beams diffused by the hologram recording medium 55, a ratio of coherent light beams not to be used for illumination of the illumination zone LZ can be reduced to enhance illumination intensity on the illumination zone LZ.

Moreover, by providing the intermediate optical system 70, the direction of main beams of coherent light beams incident on the spatial light modulator 30 is oriented toward the optical axis of the spatial light modulator 30. As described later, the spatial light modulator 30 is configured mostly with a reflection- or transparent-type LCOS (Liquid Crystal on Silicon) or a liquid crystal device such as a transparent-type liquid crystal panel. It is originally intended for such type of liquid crystal device that an illumination light beam is incident roughly parallel with an optical axis. Therefore, by providing the intermediate optical system 70, coherent light beams in the originally intended direction are incident on the spatial light modulator 30, so that modulated image light beams irradiated from the spatial light modulator 30 also propagate in a direction roughly parallel with its optical axis. In this case, the range of light flux of modulated image light beams incident on a projection lens 81 included in the projection optical system 80 can be narrowed. This means that the light modulator 30 side of the projection lens 81 becomes telecentric. Telecentric means that main light beams propagate in a direction parallel with an optical axis.

When the light modulator 30 side of the projection lens 81 is telecentric, it is possible to raise an f-number of the projection lens 81. The f-number is a value obtained by dividing a focal length of a lens by an effective diameter of the lens. As the f-number becomes larger, the range of light flux incident on a lens becomes narrower, thus the lens becomes a dark lens. However, the depth of field becomes larger to restrict out of focus. For a lens of a large f-number, light of an imaging target is incident only around the lens center.

Therefore, a lens of a large f-number can have a small effective diameter with no need to strictly define the lens characteristics for the lens circumferential portion, thus can be easily designed. Accordingly, by providing the intermediate optical system 70, costs for parts and design can be reduced for the projection lens 81.

As described above, by performing simple modification to the optical system so as to provide the intermediate optical system 70 between the hologram recording medium 55 and the spatial light modulator 30, the spatial light modulator 30 side of the projection lens 81 becomes near telecentric. Accordingly, it is possible to make larger the f-number of the projection lens 81, hence the design of the projection lens 81 becomes easy and parts cost for the projection lens 81 can be restricted.

As the spatial light modulator 30, for example, a transmission-type liquid crystal microdisplay such as LCOS (liquid Crystal on Silicon) can be used. In this case, the liquid crystal microdisplay is illuminated by the illumination device 40 in the plane direction and coherent light beams pass through the liquid crystal microdisplay selectively per pixel. In this way, the liquid crystal microdisplay generates a modulated image thereon. The generated modulated image, i.e. an image light is varied its size by the projection optical system 80 and projected onto the diffuser screen 15. Speckle patterns of the modulated image projected onto the diffuser screen 15 vary with time, thus speckles become invisible.

As the spatial light modulator 30, a reflection-type microdisplay can also be used. In this case, a modulated image is generated by reflected light beams at the spatial light modulator 30 so that a plane on the spatial light modulator 30 illuminated with coherent light beams from the illumination device 40 and an emitting plane for light beams of an image, i.e. reflected light beams, of a modulated image generated by the spatial light modulator 30 become the same plane. When utilizing such reflected light beams, it is possible to use a MEMS (Micro Electro Mechanical Systems) device such as a DMD (Digital Micromirror Device) as the spatial light modulator 30. In the apparatus disclosed in Japanese Patent Laid-Open No. 2008-224760 described above, a DMD is used as the spatial light modulator 30. In addition, as the spatial light modulator 30, a transmission-type liquid crystal panel can be used.

Moreover, it is preferable that the incidence plane of the spatial light modulator 30 has the same shape and size as the illumination zone LZ that is illuminated with coherent light beams by the illumination device 40. The reason is that coherent light beams from the illumination device 40 can be used for displaying an image on the diffuser screen 15 at high utilization efficiency.

The projection optical system 80 that projects a modulated image generated by the spatial light modulator 30 on the diffuser screen 15 has the projection lens 81 having, for example, a convex shape on both surfaces. A modulated image generated by the spatial light modulator 30 is refracted by the projection lens 81 and projected onto the diffuser screen 15 as a modulated image 71. The size of the modulated image 71 projected onto the diffuser screen 15 can be adjusted with the diameter of the projection lens 81, the distance between the projection lens 81 and the spatial light modulator 30, the distance between the projection lens 81 and the diffuser screen 15, etc. The diffuser screen 15 of FIG. 1 is a transmission type to diffuse a projected modulated image light. The diffuser screen 15 may be a reflection type.

Although omitted in FIG. 1, a modulated image diffused by the diffuser screen 15 may be incident on a half mirror not shown so that a portion of the modulated image diffused by the diffuser screen 15 is reflected by the half mirror to create a virtual image of the modulated image for an observer so as to visually recognize the virtual image with natural light through the half mirror. With this arrangement, a headup display apparatus can be realized. In this case, as the half mirror, for example, a vehicle front glass can be used. When an observer sits in the driver's seat and views the forward direction, the observer can visually recognize the virtual image while viewing scenes outside the vehicle. Or, instead of the half mirror, a hologram recording medium 55 or a prism may be used.

The spatial light modulator 30 can generate a variety of modulated images. By generating modulated images at the spatial light modulator 30 and illuminating the illumination zone LZ with the modulated images, a variety of modulated images can be projected onto the diffuser screen.

In the present embodiment, in order to illuminate the illumination zone LZ, the optical device 50 including the hologram recording medium 55 is used. The hologram recording medium 55 is, for example, a reflection-type volume hologram using photopolymer. FIG. 3 is a view explaining a state in which an image of a scattering plate is generated on the hologram recording medium 55 as interference fringes.

As shown in FIG. 3, the hologram recording medium 55 is produced using scattered light beams from an actual scattering plate 6 as object beams Lo. FIG. 3 shows a state in which a hologram photosensitive material 58 that shows photosensitivity to become the hologram recording medium 55 is exposed by reference beams Lr and object beams Lo, both being coherent light beams that show coherence to each other.

As for the reference beams Lr, for example, laser beams from the laser source 61 that oscillates laser beams in a specific wavelength range are used. The reference beams Lr pass through a condenser element 7 including lenses and are incident on the hologram photosensitive material 58. In the example shown in FIG. 3, laser beams to become the reference beams Lr are incident on the condenser element 7 as a parallel light flux that is parallel with the optical axis of the condenser element 7. By passing through the condenser element 7, the reference beams Lr are reshaped, i.e. converted, from a parallel light flux into a convergent light flux and incident on the hologram photosensitive material 58. On this occasion, a focal point FP of the convergent light flux Lr is located at a position beyond the hologram photosensitive material 58. In other words, the hologram photosensitive material 58 is located between the condenser element 7 and the focal point FP of the convergent light flux Lr collected by the condenser element 7.

Next, the object beams Lo are incident on the hologram photosensitive material 58 as scattered light from the scattering plate 6 made of opal glass, for example. In the example shown in FIG. 3, the hologram recording medium 55 to be produced is a reflection-type and the object beams Lo are incident on the hologram photosensitive material 58 on the opposite side of the reference beams Lr. It is a precondition that the object beams Lo are coherent with the reference beams Lr. Therefore, for example, it is possible to separate laser beams oscillated by the same laser source 61 and use one of the separated ones as the reference beams Lr and the other as the object beams Lo described above.

In the example shown in FIG. 3, a parallel light flux that is parallel with the direction of normal to the plate surface of the scattering plate 6 is incident on the scattering plate 6 and scattered, and then the scattered beams that have passed through the scattering plate 6 are incident on the hologram photosensitive material 58 as the object beams Lo. According to this method, when an isotropic scattering plate available at usually low cost is used as the scattering plate 6, the object beams Lo from the scattering plate 6 can be easily incident on the hologram photosensitive material 58 at roughly constant intensity distribution. Moreover, according to this method, although depending on the degree of scattering by the scattering plate 6, the object beams Lo can be easily incident on respective positions of the hologram photosensitive material 58 at roughly constant intensity from the entire region of a light-emitting surface 6a of the scattering plate 6. In such a case, it is achievable that light beams incident on respective positions of the obtained hologram recording medium 55 reproduce images 5 of the scattering plate 6 at similar brightness and reproduced images 5 of the scattering plate 6 are observed at roughly constant brightness.

As described above, when the hologram photosensitive material 58 is exposed by the reference beams Lr and object beams Lo, interference fringes caused by the interference between the reference beams Lr and object beams Lo are generated and interference fringes of these light beams are recorded in the hologram photosensitive material 58 as some form of pattern, i.e. an refractive index modulation pattern, as one example in a volume hologram. Thereafter, an appropriate posttreatment corresponding to the type of the hologram photosensitive material 58 is applied, thereby obtaining the hologram recording medium 55.

FIG. 4 is a view explaining a state in which an image of a scattering plate is reproduced using interference fringes formed in the hologram recording medium 55 obtained through an exposure process of FIG. 3. As shown in FIG. 4, the hologram recording medium 55 produced with the hologram photosensitive material 58 of FIG. 3 meets its Bragg condition by means of light beams that have the same wavelength as the laser beams used in the exposure process and propagate in a reverse direction of the reference beams Lr along an optical path of the reference beams Lr. Namely, as shown in FIG. 4, a diverging light flux that diverges from a reference point SP located with respect to the hologram recording medium 55 so as to have the same positional relationship as the relative position of the focal point FP in FIG. 3 with respect to the hologram photosensitive material 58 in the exposure process and that has the same wavelength as the reference beams Lr in the exposure process is diffracted by the hologram recording medium 55 as the reproduction illumination light beams La, thereby creating the reproduced image 5 of the scattering plate 6 at a specific location with respect to the hologram recording medium 50 so as to have the same positional relationship as the relative position of the scattering plate 6 in FIG. 3 with respect to the hologram photosensitive material 58 in the exposure process.

In this occasion, reproduction beams Lb. i.e. beams obtained by diffracting the reproduction illumination light beams La by the hologram recording medium 55, for creating the reproduced image 5 of the scattering plate 6 reproduce respective points of the image 5 of the scattering plate 6 as beams propagating in the reverse direction of the optical path of the object beams Lo propagated towards the hologram photosensitive material 58 from the scattering plate 6 in the exposure process. Moreover, as shown in FIG. 3, scattered beams Lo emitted from respective points of the light-emitting surface 6a of the scattering plate 6 in the exposure process are diffused, i.e. spread, to be incident on roughly entire region of the hologram photosensitive material 58. Namely, on respective points of the hologram photosensitive material 58, the object beams Lo from the entire region of the light-emitting surface 6a of the scattering plate 6 are incident. As a result, information of the entire light-emitting surface 6a is recorded at respective points of the hologram recording medium 55. It is therefore possible that beams that form a diverging light flux from the reference point SP and function as the reproduction illumination light beams La are incident on respective points of the hologram recording medium 55 to reproduce the images 5 of the scattering plate 5 having the same contour as one another at the same location, i.e. the illumination zone LZ, respectively.

Light diffused by the hologram recording medium 55, whose diffusion angle is being restricted by the intermediate optical system 70, propagate in the direction of the illumination zone LZ. Therefore, unnecessary scattered light can be effectively restricted. Accordingly, almost all of the reproduction illumination light beams La incident on the hologram recording medium 55 can be effectively used for illuminating the illumination zone LZ.

FIG. 3 shows an example of forming interference fringes on the hologram recording medium 55 with no particular consideration of the installation location of the intermediate optical system 70. Even in this case, by providing the intermediate optical system 70 between the hologram recording medium 55 and the spatial light modulator 30, the diffusion angle of coherent light beams diffused by the hologram recording medium 55 can be restricted. Therefore, it is possible to narrow the incidence range of modulated image light beams to the projection lens 81. However, it is more desirable to form interference fringes on the hologram recording medium 55, in a state of disposing the intermediate optical system 70 at an optimum location.

The optimum location of the intermediate optical system 70 is the location where a distance from the hologram recording medium 55 to the intermediate optical system 70 is equal to the focal length of the intermediate optical system 70 and a distance from the intermediate optical system 70 to the light modulator 30 is equal to the focal length of the intermediate optical system 70.

FIG. 5 is a view explaining a method of forming interference fringes on the hologram recording medium 55, in a state of disposing the intermediate optical system 70 at an optimum location. In FIG. 5, the hologram recording medium 55 on which interference fringes are to be formed, a condenser lens 7a corresponding to the intermediate optical system 70, an aperture member 8, a condenser lens 7b corresponding to the projection optical system 80, and a scattering plate 6 are arranged in order.

The members of FIG. 5 are arranged to have the same positional relationship as the corresponding members of FIG. 1. The aperture member 8 is provided at the location of the light modulator 30 of FIG. 1.

The scattering plate 6 is a transmission-type scattering plate 6 having a wide enough diffusion angle. When parallel coherent light beams are incident on the rear side of the scattering plate 6, an incident light beam is diffused at each point of the scattering plate 6. Coherent light beams diffused by the scattering plate 6 are incident on and refracted by the condenser lens 7b and pass through the aperture member 8. The aperture member 8 has an aperture diameter of the same size as that of the light modulator 30. Accordingly, coherent light beams that illuminate the light modulator 30 entirely pass through the aperture member 8 and are incident on the condenser lens 7a. The coherent light beams incident on the condenser lens 7a are refracted there at and incident on the hologram recording medium 55. At this time, by emitting reference beams to the opposite face of the hologram recording medium 55, interference fringes are formed on the hologram recording medium 55.

When reproducing the hologram recording medium 55 produced by the method of FIG. 5, reproduction beams are incident on the recording surface of the hologram recording medium 55, as shown in FIG. 6. The reproduction beams are the coherent light beams scanned by the scanning device, as shown in FIG. 6.

The hologram recording medium 55 diffuses reproduction beams at respective points. The reproduction beams are refracted by a field lens 71 and incident on the light modulator 30. The light modulator 30 is provided at the position away from the field lens 71 by the focal length of the field lens 71. The region from the light modulator 30 to the field lens 71 side is telecentric. Therefore, on the light modulator 30, the main light beams of coherent light beams that have passed through the field lens 71 are incident roughly parallel with the optical axis of the light modulator 30. Accordingly, the main light beams of modulated image light beams generated by the light modulator 30 propagate also roughly parallel with the optical axis of the projection lens 81. Therefore, the region from the projection lens 81 to the light modulator 30 side becomes telecentric.

As described above, ideally, it is desirable to produce the hologram recording medium 55 by the method of FIG. 5. This is because it is possible to make telecentric the field lens 71 side of the light modulator 30 and also the light modulator 30 side of the projection lens 81.

However, even when the hologram recording medium 55 is produced by a method similar to that of FIG. 3, by providing the intermediate optical system 70 (field lens 71) between the hologram recording medium 55 and the light modulator 30, the diffusion, i.e. diversion angle of the hologram recording medium 55 can be restricted. Therefore, it is possible to make almost telecentric the light modulator 30 side of the projection lens 81 to set the f-number of the projection lens 81 at a large value.

In FIG. 5, when producing the hologram recording medium 55, reference beams of parallel beams are emitted to the hologram recording medium 55. In FIG. 6, reproduction beams of parallel beams are emitted to the hologram recording medium 55. However, reference beams of convergent beams may be emitted to the hologram recording medium 55 to produce thereof. In this case, reproduction beams to be emitted to the hologram recording medium 55 is required to be convergent beams.

To summarize the above description, a necessary condition for the present embodiment is that the intermediate optical system 70 (field lens 71) is provided between the hologram recording medium 55 and the light modulator 30. As a variation of this arrangement, it is considered to provide at least either the hologram recording medium 55 at the focal point of the intermediate optical system 70 or the light modulator 30 at the focal point of the intermediate optical system 70. It is a further variation to produce the hologram recording medium 55 by the method of FIG. 5.

Next, the configuration of the irradiation unit 60 that emits coherent light beams to the optical device 50 made of the hologram recording medium 55 described above will be explained. In the example shown in FIGS. 1 to 4, the irradiation unit 60 is provided with the laser source 61 that generates coherent light beams and the scanning device 65 that changes the propagation direction of coherent light beams from the laser source 61.

The laser source 61 may be a plurality of laser sources 61 that emit laser beams of different wavelength ranges. When a plurality of laser sources 61 are used, it is arranged that the same point on the scanning device 65 is irradiated with a laser beam from each laser source 61. With this arrangement, the hologram recording medium 55 is illuminated with reproduction illumination light beams having illumination colors of the laser sources 61 mixed with one another.

The laser source 61 may be a singe-color laser source or a plurality of laser sources of different emission colors, for example, red, green and blue. When a plurality of laser sources are used, the laser sources are arranged so that coherent light beams from the laser sources are emitted to a single point on the scanning device 65. With this arrangement, coherent light beams from the laser sources are reflected by the scanning device 65 at reflection angles corresponding to the incidence angles of coherent light beams from the laser sources, incident on the hologram recording medium 55, diffracted by the hologram recording medium 55 separately, and superimposed on one another on the illumination zone LZ, thereby having a combined color. If the laser source 61 is configured with a plurality of laser sources of, for example, red, green and blue, the combined color is white. Or a scanning device 65 may be provided for each laser source.

For example, when illuminating with white, a color much closer to white may be reproduced by providing another laser source, for example, a laser source that emits light in yellow, other than red, green and blue. Therefore, there is no particular limitation on the type of laser source provided in the irradiation unit 60.

When creating a color modulated image, a variety of realization techniques are considered. When the light modulator 30 is configured with LCOS or the like equipped with a color filter for each pixel, by illuminating the illumination zone LZ with white light, it is possible to create a color modulated image at the light modulator 30.

Or it may be arranged that a light modulator 30 to generate a red modulated image, a light modulator 30 to generate a green modulated image, and a light modulator 30 to generate a blue modulated image are closely arranged and three illumination zones LZ to illuminate the three light modulators 30, respectively, are successively illuminated with diffused light from the hologram recording medium 55. With this arrangement, it is possible to combine three-color modulated images generated by the three light modulators 30 to create a color modulated image. Instead of such time division driving, three-color modulated images generated by three light modulators 30 simultaneously may be combined by using a prism or the like to create a color modulated image.

The projection optical system 80 described above is provided mainly for the purpose of projecting a modulated image of the light modulator 30 onto the diffuser screen 15. By providing the diffuser screen 15, speckles are superimposed on one another and averaged, and as a result, become inconspicuous.

The scanning device 65 changes the propagation direction of a coherent light beam with time to direct the coherent light beam in different directions so that the coherent light beam does not travel in the same direction. This results in that the coherent light beam, the propagation direction of which is changed by the scanning device 65, scans the incidence surface of the hologram recording medium 55 of the optical device 50.

Figure 7:
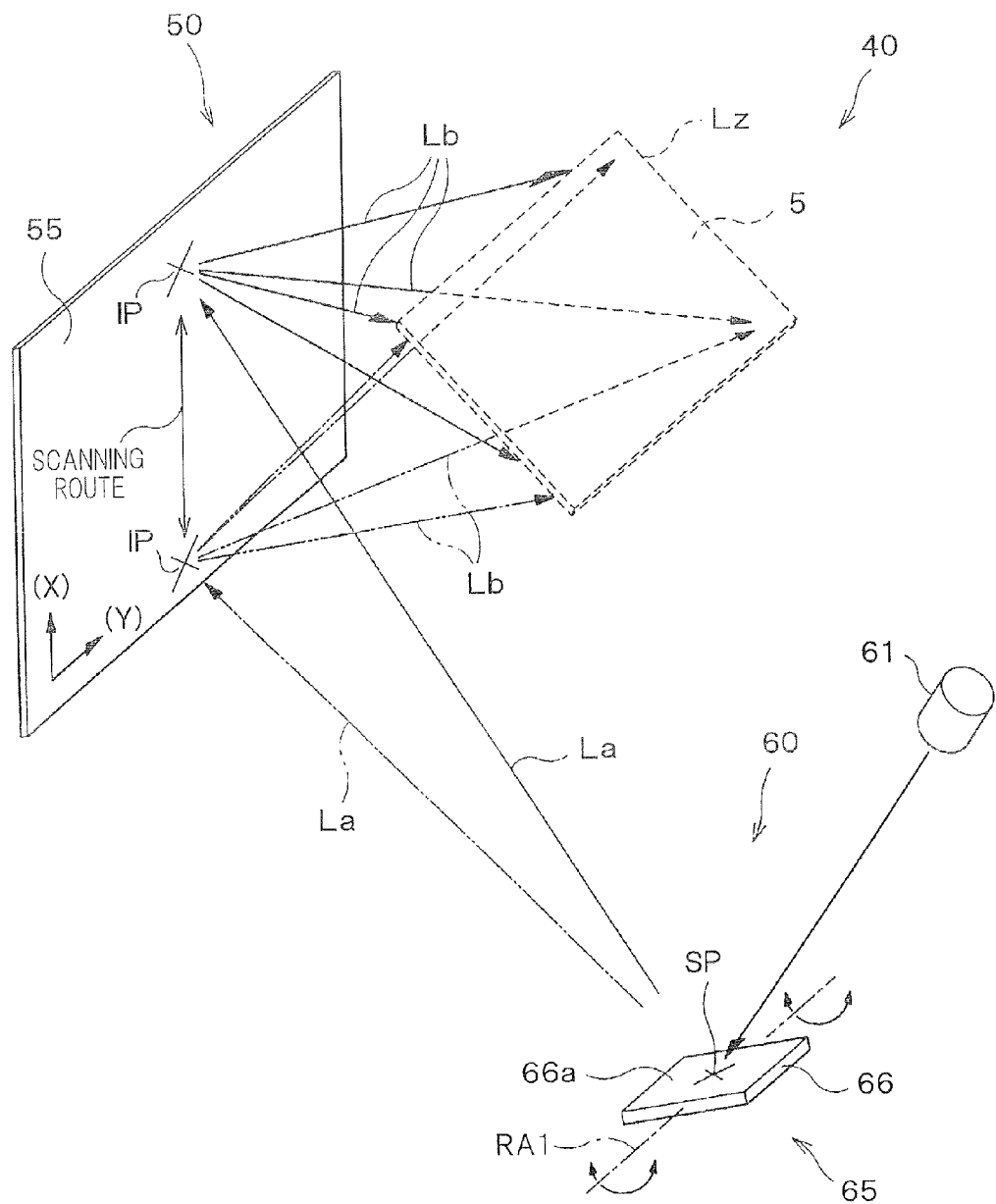
FIG. 7 is a view explaining a scanning route of a scanning device 65.

FIG. 7 is a view explaining a scanning route of the scanning device 65. The scanning device 65 according to the present embodiment includes a reflection device 66 having a reflection surface 66*a* rotatable about one axis line RA1. The reflection device 66 has a mirror device that has a mirror as the reflection surface 66*a* rotatable about one axis line RA1. The reflection device 66 is configured to change the orientation of the mirror 66*a* to change the propagation direction of the coherent light beams from the laser source 61. In this occasion, as shown in FIG. 4, the mirror device 66 is provided so as to receive the coherent light beams from the laser source 61 roughly at the reference point SP.

A coherent light beam, for which final adjustments were made to its propagation direction by the mirror device 66, can be incident on the hologram recording medium 55 of the optical device 50 as a reproduction illumination light beam La that can become one beam included in a diverging light flux from the reference point SP in FIG. 4. As a result, coherent light beams from the irradiation unit 60 scan the hologram recording medium 55 and coherent light beams incident on respective positions of the hologram recording medium 55 reproduce images 5 of the scattering plate 6 having the same contour on the same location, i.e. the illumination zone LZ.

As shown in FIG. 7, the reflection device 66 is configured to rotate the mirror 66*a* about one axis line RA1. In the example shown in FIG. 7, the rotation axis line RA1 of the mirror 66*a* extends in parallel with the y-axis of the x-y axis unit, that is, the x-y axis unit having the x-y plane in parallel with the surface of the hologram recording medium 55, defined on the surface of the hologram recording medium 55. Then, the mirror 66*a* rotates about the axis line RA1 that is in parallel with the y-axis of the x-y axis unit defined on the surface of the hologram recording medium 55. Therefore, an incidence point IP of a coherent light beam from the irradiation unit 60 on the optical device 50 moves in a reciprocating motion in the direction parallel with the x-axis of the x-y axis unit defined on the surface of the hologram recording medium 55. Namely, in the example shown in FIG. 7, the irradiation unit 60 emits a coherent light beam to the optical device 50 to scan the hologram recording medium 55 along a straight route.

The scanning device 65 including the mirror device 66 and other components is, as described above, a member rotatable about at least the axis line A1 and configured with a MEMS, for example. The scanning device 65 periodically moves in rotational motion, however, there is no particular limitation on its rotational frequency as far as it can scan with coherent light beams at about 1/30 seconds per one cycle for use, for example, in a backlight apparatus with which a human directly observes or at higher speed in accordance with the type of image to be displayed.

As a practical problem, the hologram photosensitive material 58 may shrink when the hologram recording medium 55 is produced. In such a case, it is preferable to adjust the incidence and emission angles of coherent light beams to be emitted to the optical device 50 from the irradiation unit 60 under consideration of the shrinkage of the hologram photosensitive material 58. Therefore, the wavelength of coherent light beams generated by the laser source 61 does not need to be precisely the same as the wavelength of the light beam used in the exposure process of FIG. 3 but may be roughly the same.

In a similar reason, even if the propagation direction of a light beam to be incident on the hologram recording medium 55 of the optical device 50 does not take precisely the same route as one beam included in a diverging light flux from the reference point SP, an image 5 can be reproduced in the illumination zone LZ. Actually, in the examples shown in FIGS. 4 and 7, the mirror, i.e. reflection plane 66*a* of the mirror device 66 of the scanning device 65 is inevitably displaced from its rotational axis line RA1. Therefore, when the mirror 66*a* is rotated about the rotational axis line RA1 that does not pass through the reference point SP, a light beam to be incident on the hologram recording medium 55 may not be one of the beams that form a diverging light flux from the reference point SP. However, practically, an image 5 can be substantially reproduced in a manner that the image 5 is superimposed on the illumination zone LZ by means of coherent lights from the irradiation unit 60 having the shown configuration.

The scanning device 65 may not necessarily be a device for reflecting coherent light beams but may be a device for refracting or diffracting coherent light beams so that coherent light beams scan the optical device 50.

(Effects of Present Embodiment)

Next, the functions of the projection apparatus 20 having the configuration described above will be explained.

In the projection apparatus 20 according to the present embodiment, the scanning device 65 scans the hologram recording medium 55 with coherent light beams, coherent light beams diffused by the hologram recording medium 55 are then incident on the intermediate optical system 70, to illuminate the illumination zone LZ while the diffusion angle of the coherent light beams is being restricted by the intermediate optical system 70. Accordingly, among the coherent light beams diffused by the hologram recording medium 55, a ratio of coherent light beams that are not used for illumination of the illumination zone LZ is lowered to improve illumination intensity on the illumination zone LZ.

Moreover, by providing the intermediate optical system 70, the main beams of modulated image light beams incident on the projection optical system 80 from the spatial light modulator 30 become roughly parallel with the optical axis of the projection optical system 80. Therefore, the light modulator 30 side of the projection lens 81 becomes telecentric, so that the f-number of the projection lens 81 becomes higher. Accordingly, design of the projection optical system 80 becomes easier and costs for design and parts can be reduced.

Furthermore, when producing the hologram recording medium 55, as shown in FIG. 5, by arranging the hologram recording medium 55, the intermediate optical system 70, the aperture member 8, and the projection optical system 80 to make telecentric on both sides of the aperture member 8, to form interference fringes on the hologram recording medium 55, it is possible to make telecentric on the intermediate optical system 70 side of the light modulator 30 while reproducing the hologram recording medium 55.

As described above, in the present embodiment, a modulated image is generated by using the scanning device 65, the optical device 50 including the hologram recording medium 55, and the light modulator 30. Therefore, compared to generate a modulated image by using, for example, an ordinary liquid crystal display apparatus, the hardware configuration up to the generation of a modulated image can be drastically made compact. Moreover, in the present embodiment, the scanning device 65 scans the hologram recording medium 55 with coherent light beams and a modulated image is projected onto the diffuser screen 15. Therefore, even though using coherent light beams, it is possible to make speckles inconspicuous, thus realizing the projection apparatus 20 capable of displaying high-quality images. Moreover, by providing the diffuser screen 15, it is possible to widen the viewing angle.

The scanning device 65 makes coherent light beams incident on specific positions on the hologram recording medium 55 at an incidence angle that meets the Bragg condition on the respective positions. As a result, the coherent light beams incident on the specific positions reproduce images 5 of the scattering plate 6 in a manner that the images 5 are superimposed one another on the entire region of the illumination zone LZ by diffraction caused by interference fringes recorded in the hologram recording medium 55. Namely, the coherent light beams incident on specific positions of the hologram recording medium 55 are diffused, i.e. spread, by the optical device 50 to be incident on the entire region of the illumination zone LZ.

In this way, the projection apparatus 60 illuminates the illumination zone LZ with coherent light beams. For example, when the laser source 61 has a plurality of laser sources 61 that emit laser beams at different colors, an image 5 of the scattering plate 6 is reproduced at each color on the illumination zone LZ. Therefore, when these laser sources 61 emit light simultaneously, the illumination zone LZ is illuminated with white that is a mixture of three colors.

In the present embodiment, an optical image can be created on the exposure medium 15 with speckles inconspicuous, as explained below.

According to Speckle Phenomena in Optics, Joseph W. Goodman, Roberts & Co., 2006 cited above, it is effective to integrate parameters such as polarization, phase, angle and time to increase modes. The modes here are speckle patterns with no correlation one anther. For example, in the case where coherent light beams are projected onto the same screen in different directions from a plurality of laser sources, modes exist in the same number as the laser sources. Moreover, in the case where coherent light beams are projected onto a screen in different directions intermittently from the same laser source, modes exist by the number of changes in the incidence direction of the coherent light beams during the time that is not covered by the resolution of human eyes. It is assumed that, in the case where there are many kinds of modes, the interference patterns of light are superimposed and averaged with no correlation, and as a result, speckles to be observed by eyes of an observer are inconspicuous.

In the projection apparatus 60 described above, coherent light beams are emitted to the optical device 50 to scan the hologram recording medium 55. Although coherent light beams incident on respective locations of the hologram recording medium 55 illuminate the entire region of the illumination zone LZ, the illuminating direction of the coherent light beams to illuminate the illumination zone LZ are different from one another. And, since the position on the hologram recording medium 55 on which a coherent light beam is incident changes with time, the incidence direction of the coherent light beam on the illumination zone LZ also changes with time.

As described above, in the present embodiment, a coherent light beam continuously scans the hologram recording medium 55. Following to this, the incidence direction of a coherent light beam to the illumination zone LZ from the projection apparatus 60 via the optical device 50 also continuously changes. When the incidence direction of a coherent light beam to the illumination zone LZ from the optical device 50 changes slightly, for example, an angle less than 1°, a speckle pattern generated on the illumination zone LZ changes greatly, resulting in superimposition of speckle patterns with no correlation. In addition, the frequency of a scanning device 65 such as a MEMS mirror and a polygonal mirror actually on the market is usually several hundred Hz or higher and a scanning device 65 of frequency reaching several ten thousands Hz is not rare.

Accordingly, according to the present embodiment described above, the incidence direction of a coherent light beam changes with time at each position of the illumination zone LZ and this change occurs at a speed that is not covered by the resolution of human eyes. Therefore, if a screen is provided at the illumination zone LZ, speckles generated corresponding to respective incidence angles are superimposed on one another and averaged to be observed by an observer. Accordingly, speckles become inconspicuous effectively to an observer who observes an image displayed on the screen. In the case of the present embodiment, the spatial light modulator 30 is provided so as to be overlapped with the illumination zone LZ for projection from the spatial light modulator 30 to the diffuser screen 15 via the projection optical system 80. The advantage mentioned above is also applied to this case. That is, speckles generated on the diffuser screen 15 are superimposed on one another and averaged. Therefore, the speckles generated on the diffuser screen 15 become inconspicuous.

As described above, in the present embodiment, the illumination device 40 can be realized with an extremely simple configuration in which the scanning device 65 scans the hologram recording medium 55 with coherent light beams and coherent light beams diffracted by the hologram recording medium 55 are incident on the entire region of the illumination zone LZ.

In the projection apparatus 20 of FIG. 1, the projection optical system 80 is provided at the latter part of the illumination device 40 using coherent light beams and the hologram recording medium 55. The configuration of the projection optical system is not limited to that described above. It is also possible to provide an existing projection optical system.

Among existing projection optical systems, there is an optical system having an integrator rod 82 and a relay optical system 83 provided at the front part of a projection optical system. The integrator rod 82 is to make constant the emitted light intensity irrespective of the place on the exit surface when the incident light intensity varies depending the places on the incidence surface.

As described above, the integrator rod 82 serves to make constant light intensity that varies depending on the places. The integrator rod 82 may be referred to as a rod integrator, however, in this specification, it is referred to as an integrator rod as a generic term.

Figure 8:
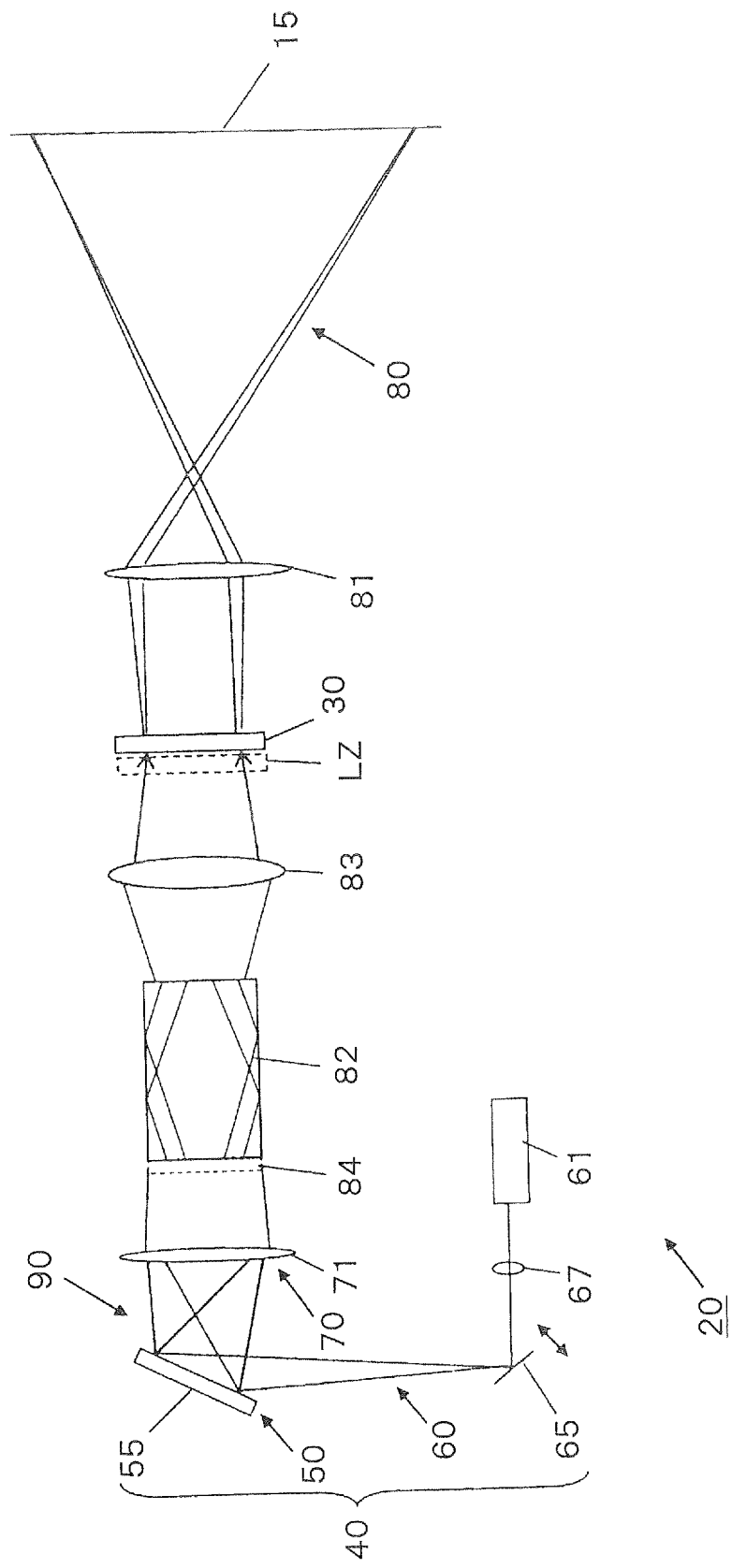
FIG. 8 is a view showing one example of an illumination device provided with an integrator rod 82 and a relay optical system 83.

FIG. 8 is a view showing one example of an illumination device provided with the integrator rod 82 and the relay optical system 83. The integrator rod 82 and the relay optical system 83 are arranged in order between the intermediate optical system 70 and the illumination zone LZ.

The integrator rod 82, the relay optical system 83, and the projection optical system 80 of FIG. 8 are not made dedicated for the projection apparatus 20 according to an embodiment. It is intended in FIG. 8 to use existing components. That is, the projection apparatus 20 of FIG. 8 has several advantageous effects described above by combining the existing configuration with the original illumination device 40. Since an existing configuration can be used, design change is easy and a cost and time for the design change can be reduced.

In the projection apparatus 20 of FIG. 8, coherent light beams having the diffusion angle restricted by the intermediate optical system 70 are incident on the incidence surface of the integrator rod 82. The integrator rod 82 allows the coherent light beams incident through an incidence surface 84 to propagate while reflecting the coherent light beams by total reflection, to emit extremely uniform coherent light beams from the exit surface.

Coherent light beams emitted from the integrator rod 82 are reflected by the relay optical system 83 to illuminate the illumination zone LZ. Similar to the projection apparatus of FIG. 1, the illumination light beams are used for generating a modulated image at the light modulator 30 and the modulated image is projected onto the diffuser screen 15 via the projection optical system 80.

In FIG. 8, the illumination device 40 is added to the existing integrator rod 82, relay optical system 83, and projection optical system 80 to constitute the projection apparatus 20. Positioning of the intermediate optical system 70 and the integrator rod 82 in the illumination device 40 is important. In more specifically, it is important to make positioning so that coherent light beams reflected by the intermediate optical system 70 are incident on the integrator rod 82 within the incidence surface thereof.

Coherent light beams diffused from the respective points of the hologram recording medium 55 in the illumination device 40 of FIG. 8 uniformly illuminate the front surface of the intermediate optical system 70. Therefore, coherent light beams incident on the incidence surface of the integrator rod 82 are also highly uniform. Accordingly, as far as the illumination device 40 of FIG. 8 is used, it is not basically necessary to use the integrator rod 82. However, as described above, it is intended that the present embodiment is applied to an existing optical system having the integrator rod 82, for example, a projection apparatus. In this case, since the optical system at the latter part of the integrator rod 82 can be used as it is, the present embodiment can be easily applied to an existing optical system.

Figure 9:
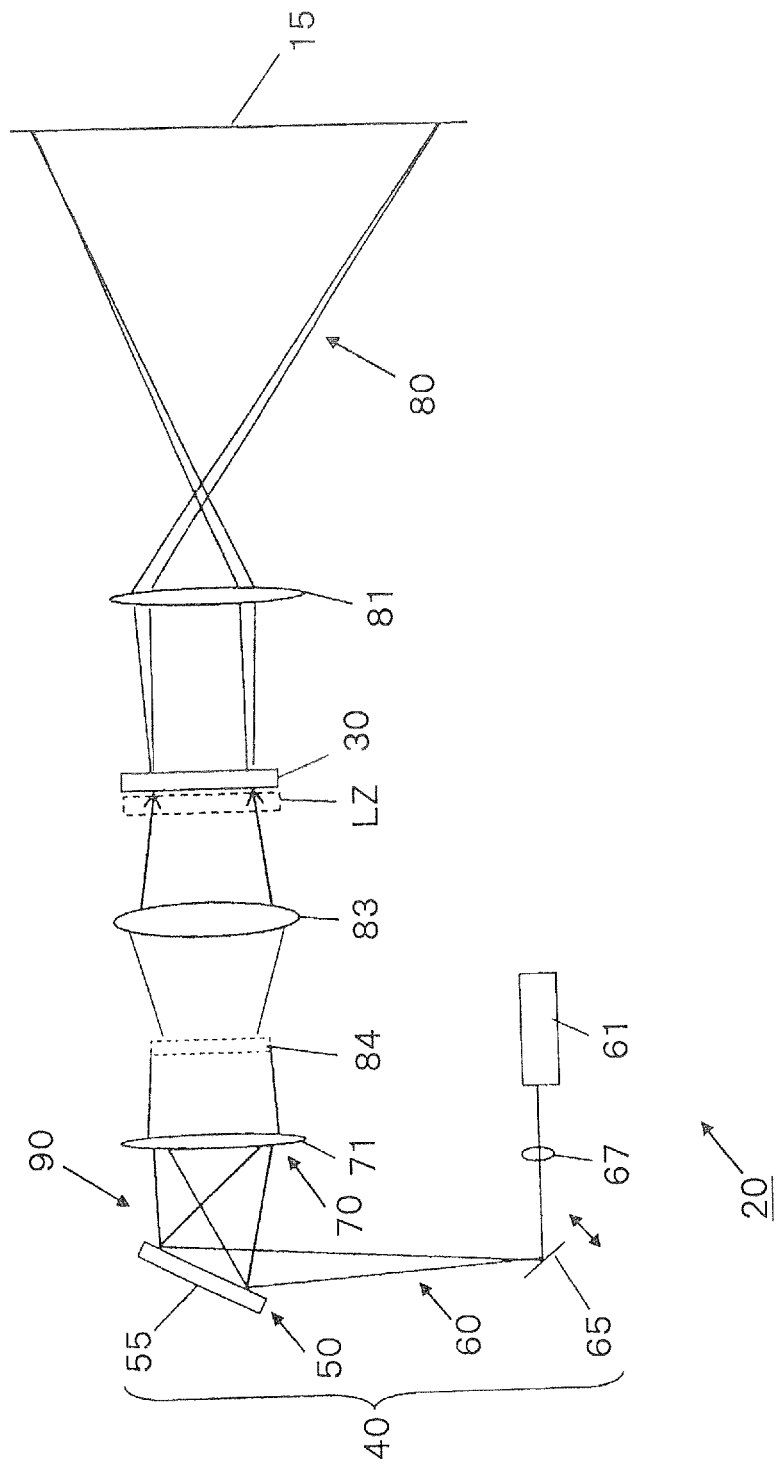
FIG. 9 is a view showing an example of applying the present embodiment to an existing projection apparatus without the integrator rod 82.

Among existing optical systems, there is an optical system without the integrator rod 82. Also in this case, the present embodiment can be easily applied. For example, FIG. 9 is a view showing an example of applying the present embodiment to an existing projection apparatus without the integrator rod 82. A projection apparatus 20 of FIG. 9 is, compared with the projection apparatus 20 of FIG. 1, provided newly with a relay optical system 83 between the intermediate optical system 70 and the light modulator. It is intended to use an existing one as the optical system from the relay optical system 83 to the projection optical system 80.

A virtual intermediate image 84 is generated between the intermediate optical system 70 and the relay optical system 83. The location of the virtual intermediate image 84 corresponds to the exit surface of the integrator rod 82. The relay optical system 83 forms an image of the intermediate image 84 on the illumination zone LZ.

The projection apparatus of FIG. 9 is not provided with the integrator rod 82. Therefore, if light intensity distribution of the intermediate image 84 is not uniform, light intensity distribution on the illumination zone LZ is also not uniform. However, as described above, coherent light beams diffused at the respective points of the hologram recording medium 55 in the illumination device 40 of the present embodiment are uniformly incident on the entire region of the intermediate optical system 70. Therefore, the intermediate image 84 has uniform light intensity distribution and hence, practically, there is no problem even though there is no integrator rod 82.

As described above, by combining the illumination device 40 of the present embodiment with part of an existing projection apparatus, it is possible to easily configure a projection apparatus having a speckle reducing function and reduce time and cost required for design change from an existing projection apparatus.

(Other Features of Present Embodiment)

In Speckle Phenomena in Optics, Joseph W. Goodman, Roberts & Co., 2006 mentioned above, a method using a numerical value corresponding to a speckle contrast as a parameter to indicate the degree of speckles generated on a screen has been proposed. The speckle contrast is the quantity defined as a value obtained by dividing the standard deviation of variation in intensity actually occurred on a screen by an average value of the intensity when a test-pattern image to originally show uniform intensity distribution is displayed. A larger value of the speckle contrast means a larger degree of generation of speckles on a screen and indicates to an observer that a spotted luminance-unevenness pattern is more remarkable.

In addition, according to the present embodiment described above, the following advantages can be obtained.

According to the present embodiment described above, the optical device 50 for making speckles inconspicuous can also function as an optical member for shaping and adjusting the beam shape of a coherent light beam emitted from the irradiation unit 60. Therefore, it is possible to miniaturize and simplify the optical system.

Moreover, according to the present embodiment described above, coherent light beams incident on respective positions of the hologram recording medium 55 generate images of the scattering plate 6 in respective colors on the entire region of the illumination zone LZ. Therefore, it is possible to utilize all of the light beams diffracted by the hologram recording medium 55 for illumination, thus improving utilization efficiency of light beams from the laser source 61.

(Avoidance of Zero-Order Light)

Part of coherent light beams from the irradiation unit 60 is not diffracted by the hologram recording medium 55 but passes through the hologram recording medium 55. This type of light is called zero-order light. When zero-order light is incident on the illumination zone LZ, an abnormal region, i.e. a spotted region, a line region, and a plane region, inevitably appears in which brightness, i.e. intensity, is rapidly increased compared with the surroundings.

When a reflection-type hologram recording medium 55, hereinafter, "a reflection-type hologram", is used, the illumination zone LZ is not provided in a propagation direction of zero-order light, hence it is relatively easy to avoid zero-order light. However, when a transmission-type hologram recording medium 55, hereinafter, "a transmission-type hologram" is used, it is relatively difficult to have a configuration to avoid zero-order light. Therefore, it is desirable in the case of a transmission-type hologram to raise a diffraction efficiency as much as possible to restrict the influence of zero-order light as much as possible.

(Reflection- and Transmission-Type Hologram Recording Media 55)

Reflection-type holograms show higher wavelength selectivity than transmission-type holograms. In other words, in reflection-type holograms, although interference fringes corresponding to different wavelengths are superimposed one another in layers, a coherent light beam having a desired wavelength can be diffracted by a desired layer only. In addition, reflection-type holograms are excellent in that the influence of zero-order light can be easily removed.

On the other hand, although transmission-type holograms have a wide spectrum range for diffraction and a high acceptable level to the laser source 61, if interference fringes corresponding to different wavelengths are superimposed one another in layers, layers other than a desired layer also diffract coherent light of a desired wavelength. Therefore, in general, it is difficult to configure transmission-type holograms in a layered structure.

(Irradiation Unit 60)

The embodiments described above show an example in which the irradiation unit 60 includes the laser source 61 and the scanning device 65. The scanning device 65 includes, for example, the one-axis-rotation type mirror device 66 that changes the propagation direction of a coherent light beam by reflection. However, the scanning device 65 is not limited thereto. As shown in FIG. 10, the scanning device 65 may be configured so that the mirror, i.e. reflection plane 66a, of the mirror device 66 can rotate about a first rotation axis line RA1 as well as about a second rotation axis line RA2 intersecting the first rotation axis line RA1. In the example shown in FIG. 10, the second rotation axis line RA2 of the mirror 66a is perpendicular to the first rotation axis line RA1 which is extended in parallel to the Y axis of the XY coordinate system defined on the plate plane of the hologram recording medium 55. Then, since the mirror 66a can rotate about both of the first axis line RA1 and the second axis line RA2, the incidence point IP of a coherent light beam of the irradiation unit 60 incident on the optical device 50 can be shifted on the plate plane of the hologram recording medium 55 in two-dimensional directions. Therefore, as an example, as shown in FIG. 10, the incidence point IP of a coherent light beam incident on the optical device 50 can be shifted along a circumference.

Moreover, the scanning device 65 may include two or more mirror devices 66. In this case, although the mirror 66a of the mirror device 66 can rotate about only a single axis line, the incidence point IP of a coherent light beam from the irradiation unit 60 incident on the optical device 50 can be shifted on the plate plane of the hologram recording medium 55 in two-dimensional directions.

As a concrete example of the mirror device 66a included in the scanning device 65, there are a MEMS mirror, a polygonal mirror, a galvano scanner, etc.

Moreover, the scanning device 65 may be configured to include other devices other than a reflection device, for example, the mirror device 66 described above, which changes the propagation direction of a coherent light beam by reflection. For example, the scan device 65 may include a refraction prism, a lens, etc.

Essentially, the scanning device 65 is not an inevitable component. The light source 61 of the irradiation unit 60 may be configured so that they can be displaced, i.e. moved, oscillated, and rotated, with respect to the optical device 50. Coherent light beams emitted from the light source 61 may scan the hologram recording medium 55 in accordance with the displacement of the light source 61 with respect to the optical device 50.

Coherent light beams emitted from the light source 61 are ideally a line beam, however, actually diffused a little bit and not always necessarily be incident on one point of the scanning device 65. Therefore, as shown in FIG. 1, a condenser lens 67 may be provided between the light source 61 and the scanning device 65 in the irradiation unit 60. The position of the condenser lens 67 is adjusted so that coherent light beams from the light source 61 are converged on one point of the scanning device 65. By this positioning, the rotation center of the scanning device 65 and the diffusion center of coherent light beams coincide with each other. Therefore, when the scanning device 65 rotates, diverging light from the reference point SP can always be incident on the hologram recording medium 55 to illuminate the illumination zone LZ, as originally intended.

The light source 61 of the irradiation unit 60 may not always necessary to oscillate a laser beam shaped into a line beam. Particularly, in the embodiments described above, coherent light beams emitted to respective positions of the optical device 50 are shaped by the optical device 50 into a light flux which is incident on the entire region of the illumination region LZ. Therefore, no problem occurs even if coherent light beams emitted from the light source 61 of the irradiation unit 60 to the optical device 50 are not accurately shaped. For this reason, coherent light beams generated from the light source 61 may be diverging light. In addition, the shape of coherent light beams, in cross section, generated from the light source 61 may be an ellipse or the like instead of a circle. In addition, the transverse mode of coherent light beams generated from the light source 61 may be a multi-mode.

In addition, when the light source 61 generates a diverging light flux, coherent light beams are incident on the hologram recording medium 55 of the optical device 50 not on a spot but on a region having a certain area. In this case, light beams which are diffracted by the hologram recording medium 55 and incident on respective positions of the illumination region LZ are angle-multiplexed. In other words, in each instant, on respective positions of the illumination region LZ, coherent light beams are incident from directions within a certain angle range. Due to the angle-multiplexing, it is possible to more effectively make speckles inconspicuous.

Moreover, in FIG. 1, an example is shown in which coherent light beams reflected by the scanning device 65 are directly incident on the optical device 50. However, a condenser lens may be provided between the scanning device 65 and the optical device 50 to convert coherent light beams into a parallel light flux that is incident on the optical device 50. In this kind of example, instead of a converging light flux described above, a parallel light flux is used as the reference light beam Lr in the exposure process in the production of the hologram recording medium 55. The hologram recording medium 55 described above can be more simply produced and replicated.

(Optical Device)

In the embodiments described above, although the example in which the optical device 50 is configured with a reflection-type volume hologram recording medium 55 using photopolymer has been described, the present invention is not limited thereto. Moreover, the optical device 50 may include a volume hologram recording medium that is a type in which recording is performed by using a photosensitive medium including a silver halide material. Moreover, the optical device 50 may include a transmission-type volume hologram recording medium 55 or a relief-type, i.e. emboss-type hologram recording medium 55.

With respect to the relief-type, i.e. emboss-type, hologram recording medium, a hologram interference fringe is recorded using a convex-concave structure of the surface thereof. However, in the case of the relief-type hologram recording medium, scattering due to the convex-concave structure of the surface may also cause generation of undesirable new speckles, hence in this respect, the volume hologram recording medium is preferable. In the case of the volume hologram recording medium, a hologram interference fringe is recorded as a refractive index modulation pattern, i.e. refractive index distribution, of an inner portion of the medium, hence there is no influence of scattering because of the convex-concave structure of the surface.

However, even when the volume hologram recording medium is used, a type in which recording is performed using a photosensitive medium including a silver halide material may become a cause of generating new speckles due to scattering of silver halide particles. In this respect, the volume hologram recording medium using a photopolymer is preferable as the hologram recording medium 55.

Moreover, in the recording process shown in FIG. 3, although a so-called Fresnel-type hologram recording medium 55 is produced, a Fourier transform-type hologram recording medium 55 which can be obtained through recording using lenses may be produced. When the Fourier transform-type hologram recording medium 55 is used, lenses can also be used for image reproduction.

In addition, a striped pattern, i.e. refractive index modulation pattern or convex-concave pattern, which is to be formed on the hologram recording medium 55 may be designed by using a computer based on a planned wavelength or incidence direction of a reproduction illumination light beam La, a shape or position of an image to be reproduced, and the like, without use of an actual object light beam Lo and reference light beam Lr. The hologram recording medium 55 obtained in this manner is also called a computer generated hologram recording medium. Moreover, when a plurality of coherent light beams having mutually different wavelength ranges are emitted from the irradiation unit 60 in a similar manner in the modification described above, the hologram recording medium 55 as a computer generated hologram recording medium may be partitioned two-dimensionally into a plurality of regions provided corresponding to coherent light beams of respective wavelength ranges so that the coherent light beams of the respective wavelength ranges are diffracted in the corresponding regions to reproduce images.

Moreover, in the embodiments described above, although the example is described in which the optical device 50 includes the hologram recording medium 55 by which coherent light beams emitted to respective positions thereof are spread to illuminate the entire region of the illumination region LZ, the present invention is not limited thereto. Instead of the hologram recording medium 55 or in addition to the hologram recording medium 55, the optical device 50 may include a lens array as an optical device by which the propagation directions of coherent light beams incident on respective positions thereof are changed and the coherent light beams are diffused to illuminate the entire region of the illumination region LZ. As a concrete example of the lens array, a total reflection-type or refraction-type Fresnel screen having a diffusing function, a fly-eye lens, and the like may be exemplified. In this type of illumination device 40, the irradiation unit 60 and the optical device 50 may be configured so that the irradiation unit 60 emits coherent light beams to the optical device 50 so that the coherent light beams scan the lens array and the coherent light beams incident on respective positions of the optical device 50 from the irradiation unit 60, whose propagation directions are changed by the lens array, illuminate the illumination region LZ, thus effectively making speckles inconspicuous.

Instead of the hologram recording medium 55 and the lens array, the optical device 50 may be configured with a scattering plate. The scattering plate 6 may be glass material such as opal glass or obscure glass, or a resin scattering plate. Since the scattering plate diffuses coherent light beams reflected by the scanning device 65, like when the hologram recording medium 55 or the lens array is used, it is possible to illuminate the illumination region LZ from various directions. The term "diffusion" in the optical device according to the present invention means that incident light beams are widened in angle and emitted. Not only the case where the diffusion angle is controlled enough by a diffraction optical device, a lens array, etc. but also the case where an emission angle is widened by scattering particles such as opal glass is included.

(Illuminating Method)

In the embodiments described above, an example has been shown in which the irradiation unit 60 is configured to be able to scan the optical device 50 in a one-dimensional direction with coherent light beams and the hologram recording medium 55 or the lens array of the optical device 50 is configured to diffuse the coherent light beams incident on respective positions of the hologram recording medium 55 or the lens array in a two-dimensional direction, so that the illumination device 40 illuminates the two-dimensional illumination region LZ. However, as described above, the present invention is not limited to such example. For example, the irradiation unit 60 may be configured to be able to scan the optical device 50 in a two dimensional direction with coherent light beams and the hologram recording medium 55 or the lens array of the optical device 50 may be configured to diffuse the coherent light beams incident on respective positions of the hologram recording medium 55 or the lens array in a two-dimensional direction, so that the illumination device 40 illuminates the two-dimensional illumination region LZ, as shown in FIG. 10.

Moreover, as already described, the irradiation unit 60 may be configured to be able to scan the optical device 50 in a one-dimensional direction with coherent light beams and the hologram recording medium 55 or the lens array of the optical device 50 may be configured to diffuse the coherent light beams incident on respective positions of the hologram recording medium 55 or the lens array in a one-dimensional direction, so that the illumination device 40 illuminates the one-dimensional illumination region LZ. In this configuration, the scanning direction of a coherent light beam from the irradiation unit 60 and the diffusing direction by the hologram recording medium 55 or the lens array of the optical device may be parallel with each other.

Furthermore, the irradiation unit 60 may be configured to be able to scan the optical device 50 in a one- or two-dimensional direction with coherent light beams and the hologram recording medium 55 or the lens array of the optical device 50 may be configured to diffuse the coherent light beams incident on respective positions of the hologram recording medium 55 or the lens array in a one-dimensional direction. In this configuration, as already described, the optical device 50 may have a plurality of hologram recording media 55 or lens arrays to illuminate illumination zones LZ corresponding to the hologram recording media 55 or lens arrays successively, so that illumination device 40 illuminates a two-dimensional region. In this occasion, the illumination zones LZ may be successively illuminated at a speed felt as if simultaneously illuminated for human eyes or at a low speed so that human eyes can recognize that the illumination zones LZ are successively illuminated.

In this specification, an apparatus that is a combination of the optical device 50, the scanning device 65 in the irradiation unit 60, and the intermediate optical system 70 is referred to as a projection control apparatus 90.

The present invention is not limited to the embodiments described above but includes various modifications conceivable by those skilled in the art. The effects of the present invention are also not limited to those described above. Namely, various additions, modifications and partial omissions may be made without departing from the conceptual idea and gist of present invention derived from those defined in the accompanying claims and their equivalents.

The invention claimed is:

1. A projection apparatus comprising:
   an optical device configured to diffuse incident coherent light beams and change an incident direction of the coherent light beams to each position of an illumination zone with time;
   an irradiation unit configured to irradiate the coherent light beams to the optical device while changing a propagation direction of the coherent light beams by changing angles of the coherent light beams with time so that the coherent light beams scan the optical device;
   a light modulator that is illuminated by coherent light beams incident on and diffused at respective points of the optical device from the irradiation unit;
   a projection optical system configured to project a modulated image generated by the light modulator onto a scattering plane; and
   an intermediate optical system provided between the optical device and the light modulator, configured to restrict an diffusion angle of coherent light beams diffused by the optical device,
   wherein, after the diffusion angle is restricted by the intermediate optical system, the coherent light beams diffused by the optical device are superimposed on one another to illuminate at least all the light modulator, regardless of diffusion points on the optical device,
   wherein the irradiation unit comprises:
      a light source configured to emit coherent light beams; and
      a mirror device configured to change a propagation direction of the coherent light beams emitted from the light source to make the coherent light beams scan the optical device.

2. The projection apparatus of claim 1, wherein the intermediate optical system is positioned so that a distance between the optical device and the intermediate optical system is equal to a focal length of the intermediate optical system.

3. The projection apparatus of claim 1, wherein the intermediate optical system is positioned so that a distance between the light modulator and the intermediate optical system is equal to a focal length of the intermediate optical system.

4. The projection apparatus of claim 1, wherein the light modulator side of the projection optical system is telecentric.

5. The projection apparatus of claim 1, wherein the optical device is a hologram recording medium.

6. The projection apparatus of claim 5, wherein interference fringes of the hologram recording medium are formed so that a direction of main light beams of coherent light beams diffused by the hologram recording medium and having a diffusion angle restricted by the intermediate optical system is roughly parallel with an optical axis of the light modulator.

7. The projection apparatus of claim 5, wherein the hologram recording medium is a volume hologram.

8. The projection apparatus of claim 5, wherein the hologram recording medium is a computer generated hologram.

9. The projection apparatus of claim 5, wherein the hologram recording medium is a surface relief-type holographic diffuser.

10. The projection apparatus of claim 1, wherein the optical device is a microlens array comprising a plurality of lenses.

11. The projection apparatus of claim 1, wherein the light modulator is a spatial light modulator.

12. The projection apparatus of claim 11, wherein the spatial light modulator generates the modulated image by making coherent light beams from the illumination device pass therethrough or reflecting the coherent light beams from the illumination device.

13. The projection apparatus of claim 11, wherein the spatial light modulator is a micromirror device, a reflection- or transparent-type LCOS or a transparent-type liquid crystal panel.

14. The projection apparatus of claim 1 further comprising a relay optical system provided between the intermediate optical system and the light modulator, configured to form an image of an intermediate image created by coherent light beams having a diffusion angle restricted by the intermediate optical system on the light modulator.

15. The projection apparatus of claim 14 further comprising an integrator rod provided between the intermediate optical system and the relay optical system.

16. A projection control apparatus comprising:
   an optical device configured to diffuse incident coherent light beams and change an incident direction of the coherent light beams to each position of an illumination zone with time;
   a scanning device configured to change a propagation direction of the coherent light beams by changing angles of the coherent light beams with time to make the coherent light beams scan the optical device;
   an intermediate optical system configured to restrict an diffusion angle of coherent light beams diffused by the optical device,
   wherein after the diffusion angle is restricted by the intermediate optical system, the coherent light beams diffused by the optical device are superimposed on one another to illuminate at least all of the illumination zone, regardless of diffusion points on the optical device.

* * * * *